(12) United States Patent
Kodukula et al.

(10) Patent No.: US 7,274,297 B2
(45) Date of Patent: Sep. 25, 2007

(54) RFID TAG AND METHOD OF MANUFACTURE

(75) Inventors: Venkata S. R. Kodukula, Bothell, WA (US); For S. Lam, Bothell, WA (US); Rene D. Martinez, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 233 days.

(21) Appl. No.: 10/882,660

(22) Filed: Jul. 1, 2004

(65) Prior Publication Data
US 2006/0000915 A1    Jan. 5, 2006

(51) Int. Cl.
    *G08B 13/14* (2006.01)
(52) U.S. Cl. ............ 340/572.7; 29/825; 235/441; 235/492; 340/572.1; 340/572.8
(58) Field of Classification Search ............ 340/572.1, 340/572.7, 572.8; 235/492, 487, 441; 29/825
See application file for complete search history.

(56) References Cited

U.S. PATENT DOCUMENTS

| | | | |
|---|---|---|---|
| 5,786,626 A | 7/1998 | Brady et al. ............ 257/673 |
| 5,854,480 A * | 12/1998 | Noto .................... 235/492 |
| 6,100,804 A | 8/2000 | Brady et al. ........... 340/572.7 |
| 6,147,604 A * | 11/2000 | Wiklof et al. ........... 340/572.1 |
| 6,262,692 B1 * | 7/2001 | Babb .................. 343/895 |
| 6,378,774 B1 * | 4/2002 | Emori et al. ............ 235/492 |
| 6,572,022 B2 * | 6/2003 | Suzuki ................ 235/492 |
| 6,642,897 B2 | 11/2003 | Forster et al. ........... 343/767 |
| 6,662,078 B1 | 12/2003 | Hardgrave et al. ........ 700/226 |
| 6,956,472 B1 * | 10/2005 | Walcott et al. ........... 340/505 |
| 2002/0057220 A1 * | 5/2002 | Sabet et al. ........... 343/700 MS |
| 2002/0162894 A1 * | 11/2002 | Kuramochi ............ 235/492 |
| 2003/0029921 A1 * | 2/2003 | Akita et al. ............ 235/492 |
| 2003/0226901 A1 * | 12/2003 | Kim et al. ............. 235/492 |
| 2004/0026754 A1 * | 2/2004 | Liu et al. .............. 257/414 |

FOREIGN PATENT DOCUMENTS

| | | |
|---|---|---|
| EP | 1 031 939 | 8/2000 |
| WO | WO 02/48980 | 6/2002 |
| WO | WO 03/105063 A2 | 12/2003 |

* cited by examiner

*Primary Examiner*—Brent A. Swarthout
(74) *Attorney, Agent, or Firm*—Seed IP Law Group PLLC

(57) ABSTRACT

An RFID tag may include an antenna substrate comprising a conductive layer etched or deposited to form an antenna, and a circuit substrate comprising a conductive layer etched or deposited to form a circuit, the antenna electro-magnetically coupled to the circuit. An RFID tag may be formed from an insert substrate comprising an insulative layer between two conductive layers, one of the conductive layers etched to form an antenna and the other conductive layer etched to form a circuit. The insert substrate may be received in an envelope formed by a label substrate, which may carry a pressure sensitive adhesive.

17 Claims, 11 Drawing Sheets

RFID TAG AND METHOD OF MANUFACTURE

BACKGROUND OF THE INVENTION

1. Field of the Invention

This disclosure generally relates to automatic data collection (ADC) and more particularly to radio frequency identification (RFID).

2. Description of the Related Art

The ADC arts include a variety of data carrier types for automatically collecting and storing information. One such data carrier takes the form of an RFID tag, which is sometimes provided in the form of a card. Such RFID tags typically include an insert that is received in a label. The insert typically comprises at least one insulative substrate that carries one or more conductive patterns or traces that form an antenna on one side of the insulative substrate, and a semiconductor device including memory carried on the other side of the insulative substrate. The semiconductor device is electrically coupled to the antenna by electrical current paths formed as vias or throughholes in the insulative substrate. The label typically takes the form of an envelope or other structure for receiving the insert. The label may include a face sheet that may carry human-readable and/or machine-readable markings such as printing, and may include a pressure sensitive self-adhesive and release liner, for selectively exposing the pressure-sensitive self-adhesive for adhering the RFID tag to some article, object, and/or package.

RFID tags typically act as transponders, providing information stored in the semiconductor device in response to an RF signal, commonly referred to as an interrogation signal, received at the antenna from a reader or interrogator. Some RFID tags include security measures, such as passwords and/or encryption. Many RFID tags also permit information to be stored in the semiconductor memory via an RF signal. Some RFID tags, commonly referred to as active devices, include a discrete power source, for example, a battery. Other RFID tags, commonly referred to as passive devices, rely on an RF signal to drive power.

RFID tags advantageously do not require line-of-sight for reading and writing operations, in contrast to other data carriers such as machine-readable symbols (e.g., barcodes, area or matrix codes, stacked codes). This advantage, however, is offset by the relatively high cost of RFID tags when compared to other data carriers such as labels printed with machine-readable symbols. The cost difference is quite substantial, and is a predominant factor in the acceptance of RFID tags in the marketplace. Consequently, a low-cost RFID tag employing a minimal set of materials that is simple and cost-effective to manufacture is desirable.

BRIEF SUMMARY OF THE INVENTION

In one aspect, an RFID tag may be formed from an antenna substrate and a circuit substrate, where the antenna substrate comprises a conductive layer etched to form an antenna, and the circuit substrate comprises a conductive layer etched to form a circuit. The use of separate substrates for the antenna and the circuit may reduce the amount of conductor, and hence the cost, particularly where etching is employed to form the antenna and/or circuit structures. The RFID tag may employ electro-magnetic coupling between the antenna and circuit structures, eliminating the use of vias or through-holes, thereby reducing manufacturing complexity and costs.

In another aspect, the RFID tag may be formed from an antenna substrate and a circuit substrate, where the antenna substrate comprises a conductive antenna pattern deposited thereon and the circuit substrate comprises a circuit pattern deposited thereon. Again, the use of electromagnetic coupling between the antenna and circuit structures may eliminate the use of vias or through-holes, thereby reducing manufacturing complexity and costs.

In a further aspect, an RFID tag may be formed from an insert substrate comprising an insulative layer between two conductive layers, a first one of the conductive layers etched to form an antenna and a second one of the conductive layers etched to form a circuit; and a semiconductor device coupled to the circuit. In yet a further aspect, the insert substrate may be received in a label package. A single insulative layer may reduce manufacturing complexity. The use of depositioning rather than etching may reduce the amount of conductive material employed, further reducing costs.

In a further aspect, the RFID tag may include an adhesive such as a self-adhesive and may be carried on, and selectively releasable from, a release liner.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with RFID tags, antennas, semiconductor devices, memory circuits, and interrogators or readers have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
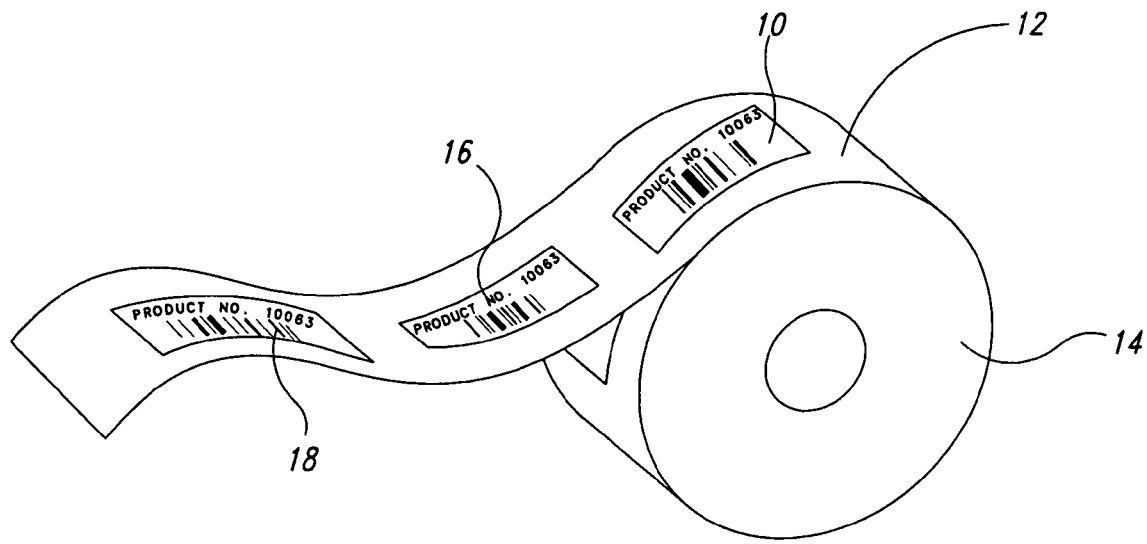
FIG. 1 is an isometric view of a plurality of RFID tags carried by a release liner and coiled in the form of a roll.

FIG. 1 shows a number of RFID tag labels or tags 10 carried by a release liner 12 coiled into a roll 14. The RFID tags 10 may include human-readable indicia 16 and/or machine-readable indicia 18, for example, barcode symbols, area or matrix code symbols, and/or stack code symbols.

FIGS. 2A-2D show an antenna substrate 20a suitable for use with the RFID tag 10. The antenna substrate 20a comprises an insulative substrate or layer 22a and a conductive substrate or layer 24a. The conductive layer 24a forms a generally U-shaped slot 26a. The slot 26a may be formed by etching a conductive layer 24a, or by depositing the conductive-layer 24a. The conductive layer may comprise any of a number of conductive materials, for example aluminum or carbon ink. The insulative layer 22a may comprise any of a number of insulative materials, for example, paper, Mylar, or polyethylene.

Figure 3A:
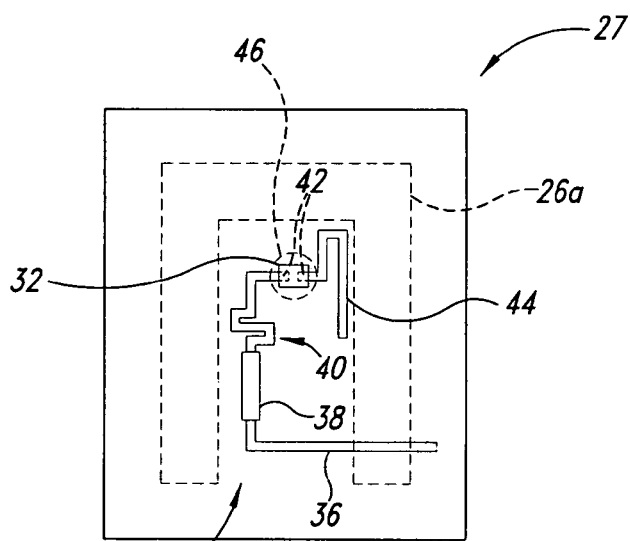
FIG. 3A is a bottom plan view of a circuit substrate carrying a circuit in a semiconductor device for use in an RFID tag according to one illustrated embodiment, with an outline of the relative position of the slot of FIGS. 2A-2D illustrated in broken line.
Figure 3B:
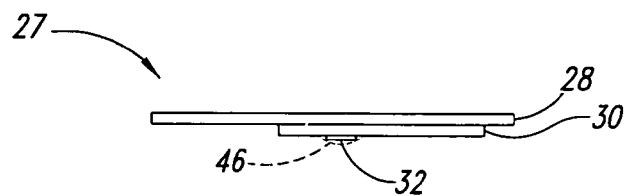
FIG. 3B is a side elevational view of the circuit substrate of FIG. 3A.
Figure 2A:
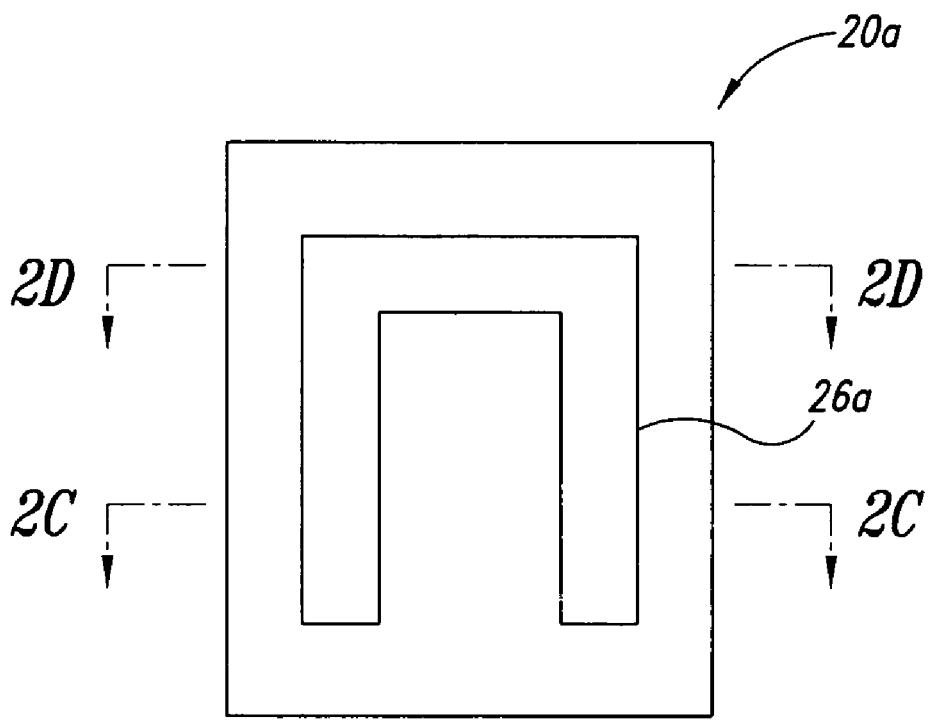
FIG. 2A is a top plan view of an antenna substrate forming a generally U-shaped slot antenna for use in an RFID tag according to one illustrated embodiment.
Figure 2B:
FIG. 2B is a side elevational view of the antenna substrate of FIG. 2A.
Figure 2C:
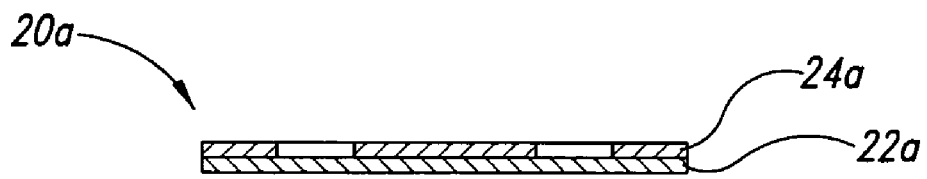
FIG. 2C is a cross-sectional view of the antenna substrate of FIG. 2A taken along section line 2C.
Figure 2D:
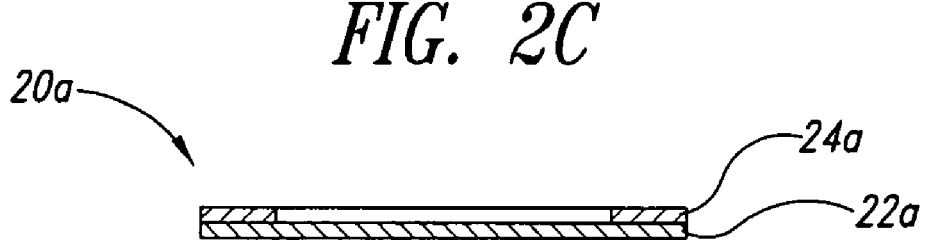
FIG. 2D is a cross-sectional view of the antenna substrate of FIG. 2A taken along section line 2D.

FIGS. 3A-3B show a circuit substrate 27 suitable for use with the RFID tags 10. An outline of the slot 26a is shown in broken line in FIG. 3A to indicate the relative location of various circuit elements with respect to the antenna formed by the conductive layer 24a of the antenna substrate 20a when the circuit substrate 27 and antenna substrate 20a are coupled to form the RFID tag 10.

The circuit substrate 27 comprises an insulative layer 28, a conductive substrate or layer 30, and one or more semiconductor devices 32 electrically coupled to portions of the conductive layer 30. The conductive layer 30 forms a circuit 34 comprising one or more circuit elements, such as an antenna line 36, a transformer 38, an inductor 40, contact pads 42, and a ground line 44.

The circuit 34 or components thereof may be electromagnetically coupled to the antenna structure formed by the conductive layer 24a, for example via inductive or capacitive coupling. The semiconductor device 32 may be electrically coupled to the contact pads 42, for example, using flip-chip techniques. The semiconductor device 32 may be electrically coupled to the contact pads 42 using other techniques such as wire bonding, although flip-chip techniques may prove more cost effective and produce a more robust RFID tag 10. An encapsulant such as a glob-top 46 may optionally be applied over the semiconductor device 32.

Figure 4A:
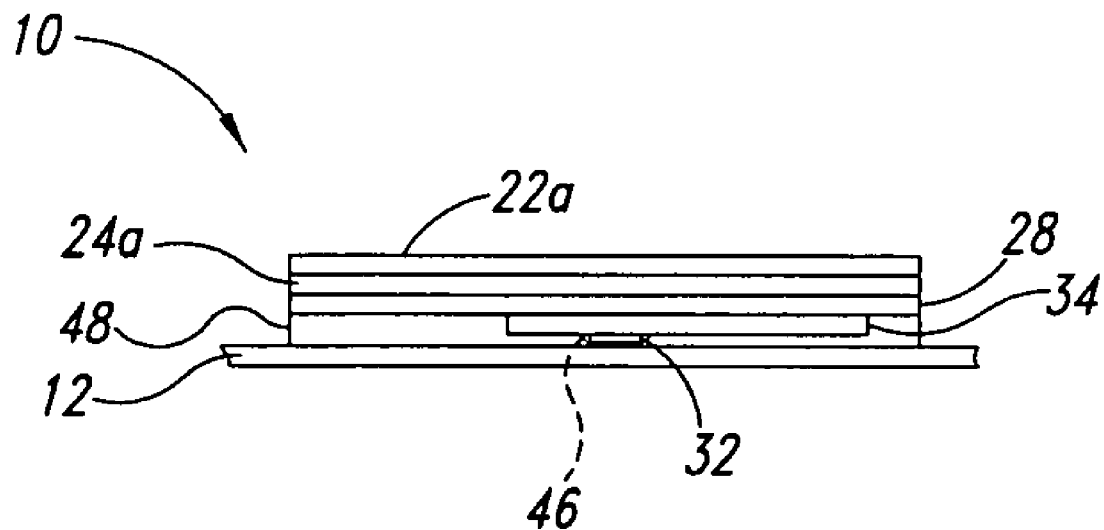
FIG. 4A is a side elevational view of an RFID tag carried by a release liner, the RFID tag formed from the antenna substrate of FIG. 2A and the circuit substrate of FIG. 3A according to one illustrated embodiment, the RFID tag further including an adhesive.

FIG. 4A shows an RFID tag 10 carried by the release liner 12, formed from the antenna substrate 20*a* and the circuit substrate 27 of FIGS. 2A-2D and 3A-3B according to one illustrated embodiment. As illustrated, the conductive layer 24*a* of the antenna substrate 20*a* may be attached or coupled to the insulative layer 28 of the circuit substrate 27. Thus, while the conductive layer 24*a* is electrically insulated from the circuit 34, it is electro-magnetically coupled thereto. This approach may eliminate a number of steps from the manufacturing process, such as forming one or more through-holes or vias in the insulative layers 22*a*, 28, and forming electrical connections through the through-holes or vias. This approach may also allow more cost effective impedance matching between the antenna (i.e., conductive layer 24*a*) and circuit 34.

Additionally, the RFID tag 10 may include an adhesive, for example, a pressure sensitive self-adhesive layer 48 deposited on, in, or over the circuit substrate 26, which may releasable adhere the RFID tag 10 to the release liner 12.

Figure 4B:
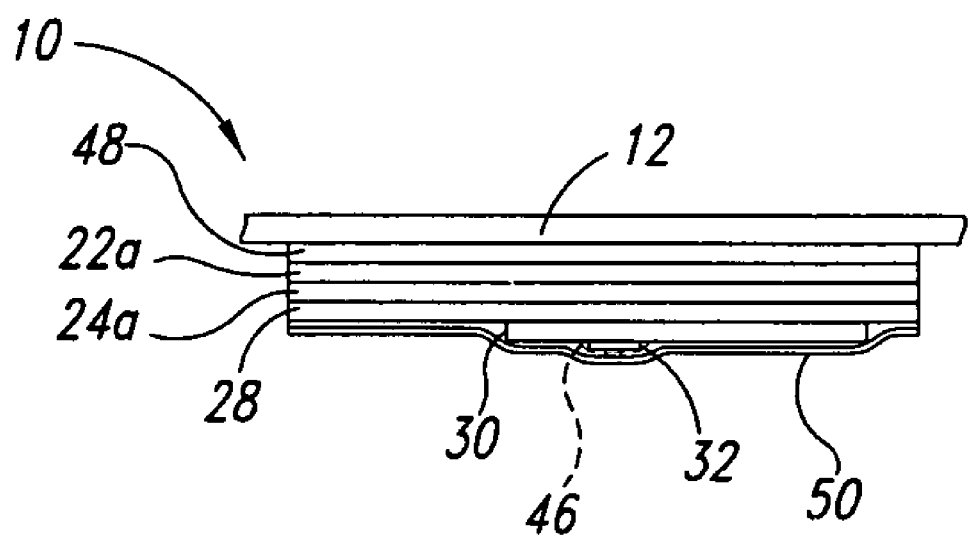
FIG. 4B is a side elevational view of an RFID tag carried by a release liner, the RFID tag formed from the antenna substrate of FIG. 2A and the circuit substrate of FIG. 3A according to another illustrated embodiment, where the adhesive is applied to the antenna substrate.
Figure 5A:
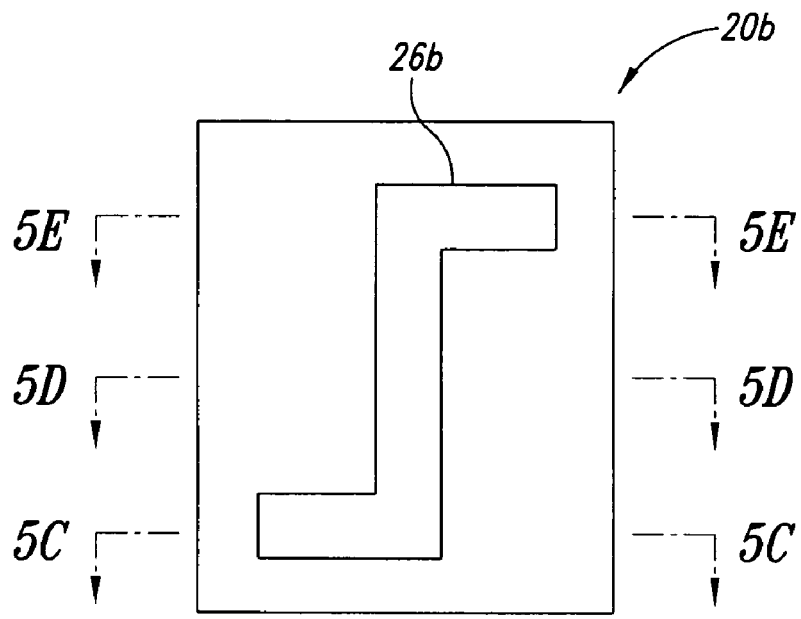
FIG. 5A is a top plan view of an antenna substrate having a generally Z-shaped slot for use in an RFID tag according to another illustrated embodiment.
Figure 5B:
FIG. 5B is a side elevational view of the antenna substrate of FIG. 5A.
Figure 5C:
FIG. 5C is a cross-sectional view of the antenna substrate of FIG. 5A taken along section line 5C.
Figure 5D:
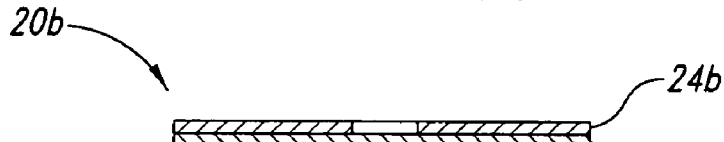
FIG. 5D is a cross-sectional view of the antenna substrate of FIG. 5A taken along section line 5D.
Figure 5E:
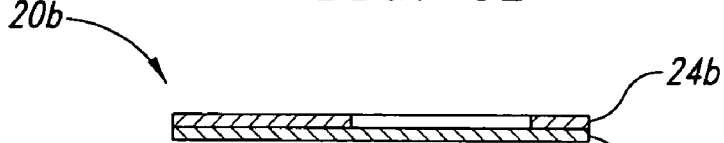
FIG. 5E is a cross-sectional view of the antenna substrate of FIG. 5A taken along section line 5E.
Figure 6A:
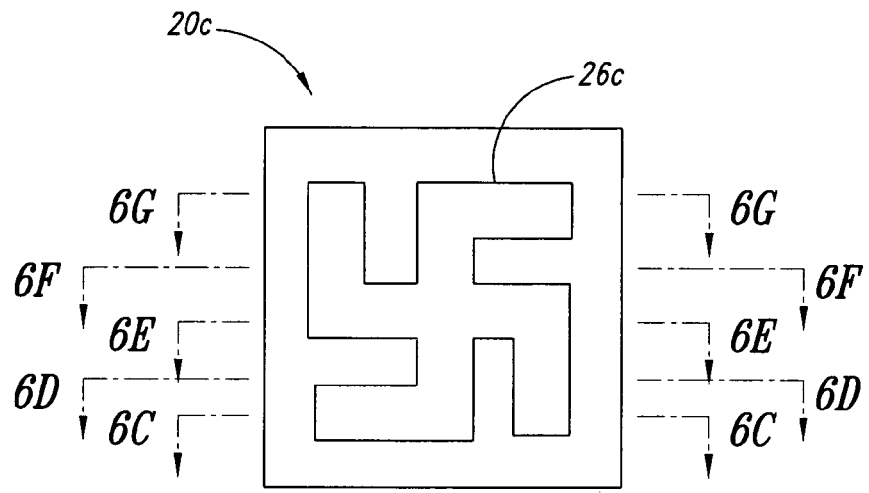
FIG. 6A is a top plan view of an antenna substrate having a generally cross-shaped slot with bent arms for use in an RFID tag according to an illustrated embodiment.
Figure 6B:
FIG. 6B is a side elevational view of the antenna substrate of FIG. 6A.
Figure 6C:
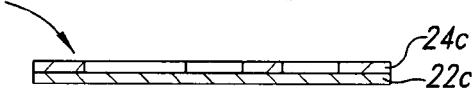
FIG. 6C is a cross-sectional view of the antenna substrate of FIG. 6A taken along section line 6C.
Figure 6D:
FIG. 6D is a cross-sectional view of the antenna substrate of FIG. 6A taken along section line 6D.
Figure 6E:
FIG. 6E is a cross-sectional view of the antenna substrate of FIG. 6A taken along section line 6E.
Figure 6F:
FIG. 6F is a cross-sectional view of the antenna substrate of FIG. 6A taken along section line 6F.
Figure 6G:
FIG. 6G is a cross-sectional view of the antenna substrate of FIG. 6A taken along section line 6G.

FIG. 4B shows an RFID tag 10 formed from the antenna substrate 20 and circuit substrate 26*a* according to another embodiment. In contrast to the embodiment of FIG. 4A, in the embodiment of FIG. 4B the adhesive 48 is applied to the opposite side of the insulative layer 22*a* of the circuit substrate 27 from the side carrying the circuit 34. Further, the RFID tag 10 may optionally comprise a layer 50 overlying the circuit 34 and semiconductor 32. The optional layer 50 may take the form of paper, Mylar or other thin flexible substrate, and may be suitable to carrying printed or inscribed indicia such as human-readable indicia 16 or machine-readable indicia 18 (FIG. 1).

FIGS. 5A-5E show another embodiment of the antenna substrate denominated 20*b* including a generally Z-shaped slot 26*b* formed in the conductive layer 24*b* carried by the insulative layer 22*b*. The antenna substrate 20*b* has different response and radiation patterns than the antenna substrate 20*a*. The antenna substrate 20*b* may be employed in a similar manner to the antenna substrate 20*a*, as generally discussed above.

FIGS. 6A-6G show a further embodiment of an antenna substrate 20*c* comprising a generally cross-shaped with bent arm slot 26*c* formed in the conductive layer 24*c* carried by the insulative layer 22*c*. The antenna substrate 20*c* has different response and radiation patterns than the antenna substrates 20*a*, 20*b*. The antenna substrate 20*c* may be employed in a similar manner to the antenna substrate 20*a*, as generally discussed above.

Figure 7A:
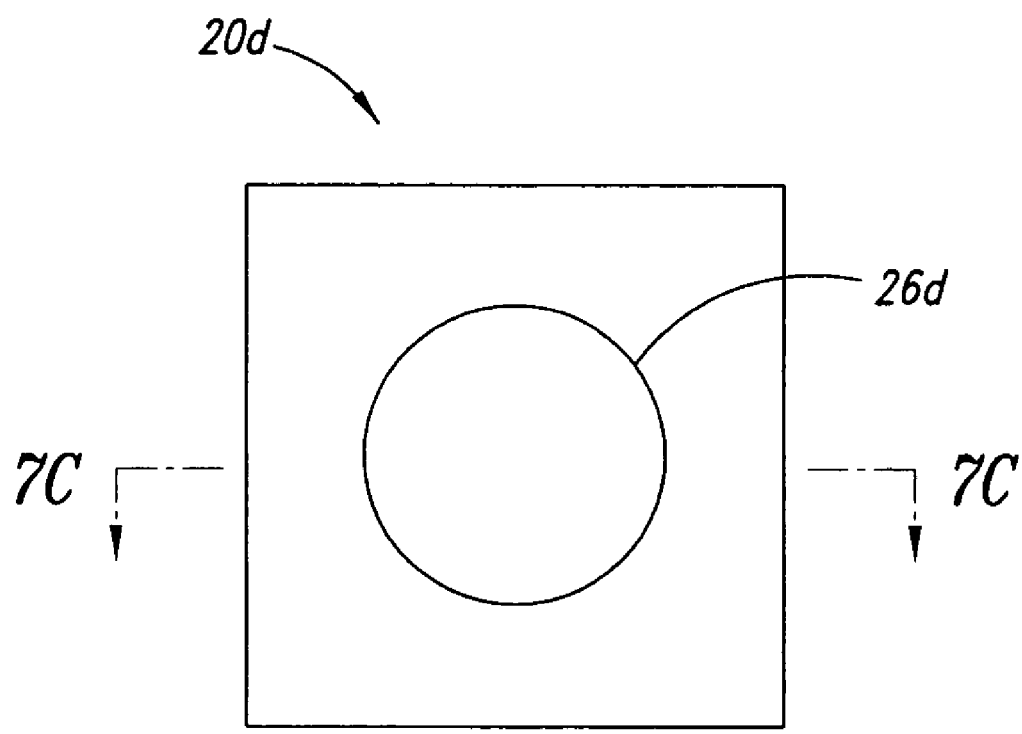
FIG. 7A is a top plan view of an antenna substrate having a generally circular or elliptical slot for use in an RFID tag according to an illustrated embodiment.
Figure 7B:
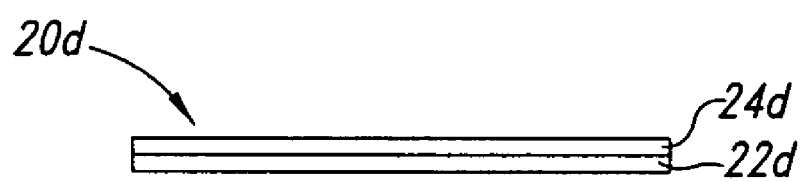
FIG. 7B is a side elevational view of the antenna substrate of FIG. 7A.
Figure 7C:
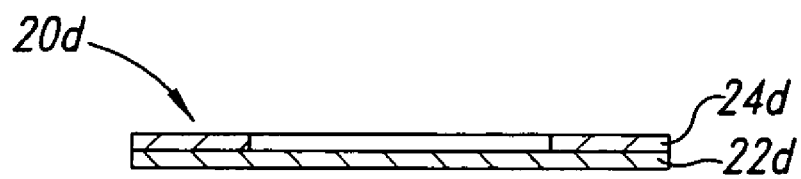
FIG. 7C is a cross-sectional view of the antenna substrate of FIG. 7A taken along section line 7C.

FIGS. 7A-7C show still another embodiment of an RFID substrate 20*d* having a generally circular or elliptical slot 26*d* formed in the conductive layer 24*d* carried by the insulative layer 22*d*. The antenna substrate 20*d* has different response and radiation patterns than the antenna substrate 20*a*, 20*b*, 20*c*. The antenna substrate 20*d* may be employed in a similar manner to the antenna substrate 20*a*, as generally discussed above.

Figure 8:
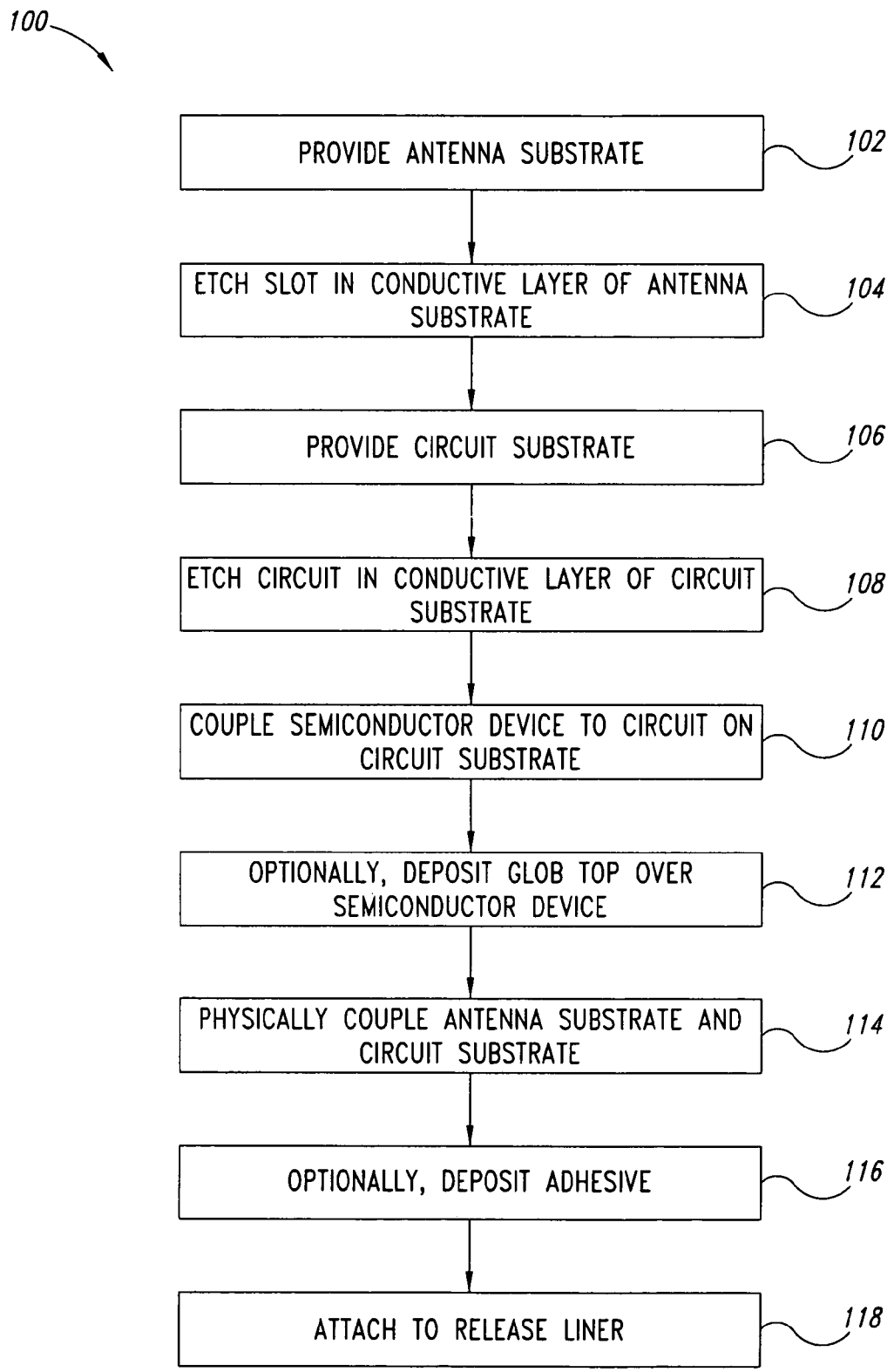
FIG. 8 is a flow diagram of a method of forming an RFID tag, involving the etching of an antenna from a conductive layer of an antenna substrate and a circuit from a conductive layer of a circuit substrate, according to one illustrated embodiment.

FIG. 8 shows a method 100 of forming an RFID tag 10 employing etching of conductive materials according to one illustrated embodiment. Since the method 100 is identical for each embodiment of the antenna substrate 20*a*, 20*b*, 20*c*, 20*d*, the antenna substrates will be referred to collectively as 20, and the corresponding insulative layers as 22, the conductive layers as 24, and the slots as 26.

At 102, the antenna substrate 20 is provided. At 104, a slot 26 is etched in the conductive layer 24 of the antenna substrate 20. At 106, a circuit substrate 27 is provided. At 108, a circuit 34 is etched in the conductive layer 30 of the circuit substrate 27. At 110, one or more semiconductor devices 32 are coupled to the contact pads 42 of the circuit 34 on the circuit substrate 27. At 112 optionally a glob-top 46 or other encapsulant is deposited over the semiconductor device 32.

At 114, the antenna substrate 20 and circuit substrate 27 are physically coupled, the positions of the various circuit elements 36-44 relative to the antenna formed by the conductive layer 24 providing an electromagnetic coupling therebetween for transmitting signals between the semiconductor device 32 and the antenna (i.e., conductive layer 24).

Optionally at 116, a pressure sensitive self-adhesive layer 48 may be deposited on or impregnated into the RFID tag 10. At 118, the RFID tag 10 is attached to the release liner 12.

Figure 9:
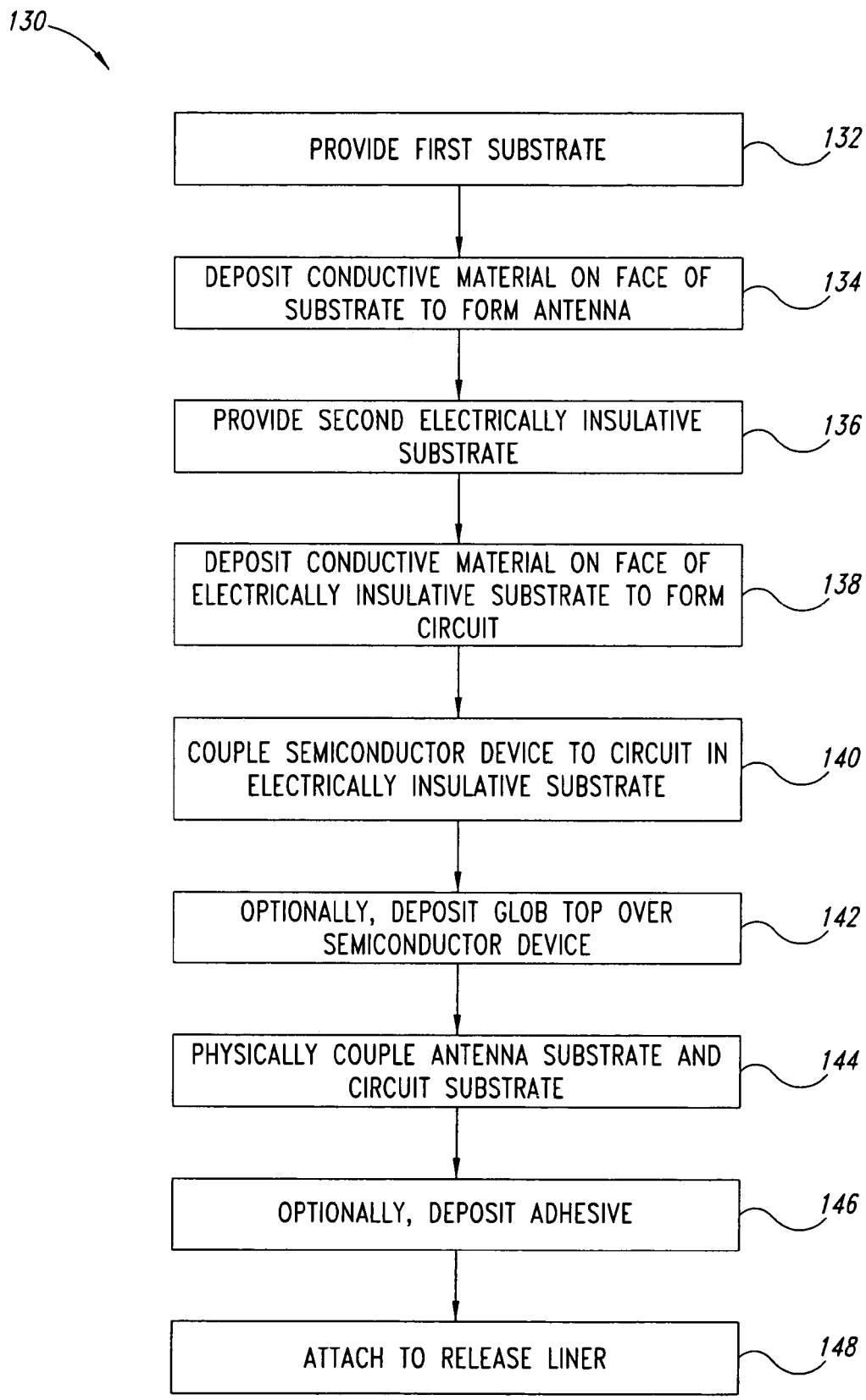
FIG. 9 is a flow diagram of a method of forming an RFID tag involving the deposition of conductive material to from an antenna on an antenna substrate and a circuit on a circuit substrate according to another illustrated embodiment.
Figure 10A:
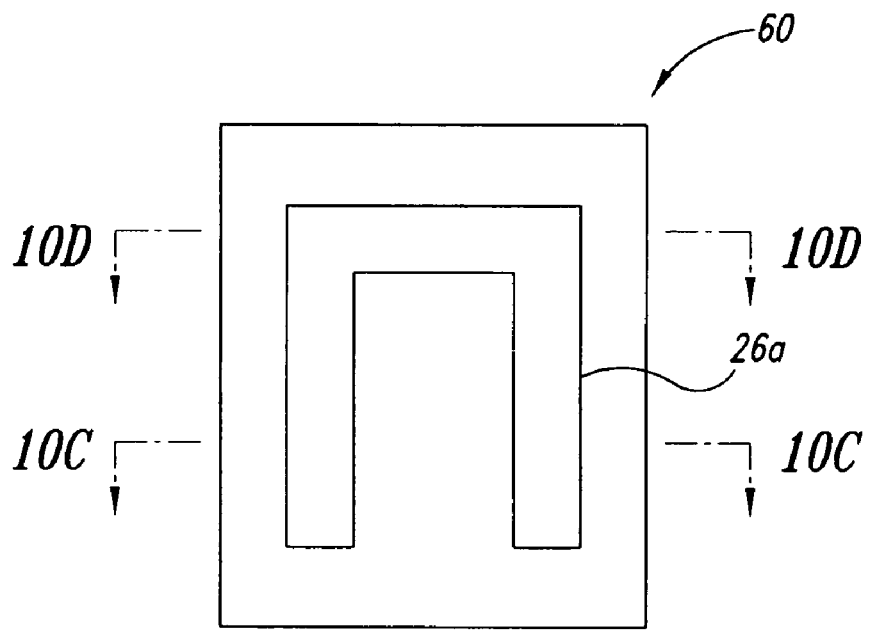
FIG. 10A is a top plan view of an insert substrate comprising an insulative layer between two conductive layers, one of the conductive layers etched to form an antenna and the other conductive layer etched to form a circuit, the antenna and circuit electromagnetically coupled to one another through the insulative layer according to one illustrated embodiment.
Figure 10B:
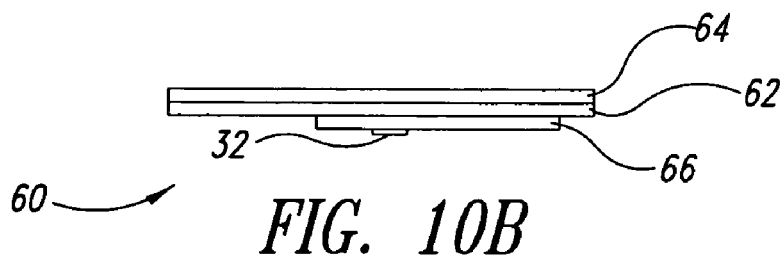
FIG. 10B is a side elevational view of the insert substrate of FIG. 10A.
Figure 10C:
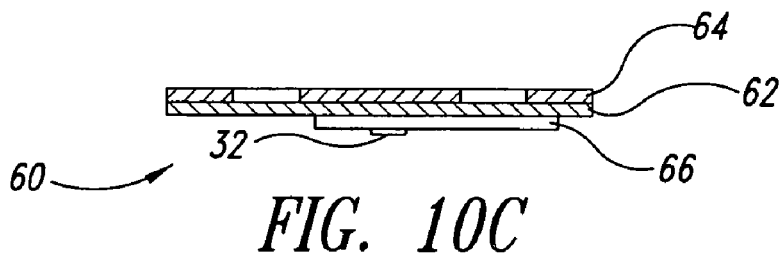
FIG. 10C is a cross-sectional view of the insert substrate of FIG. 10A taken along section line 10C.
Figure 10D:
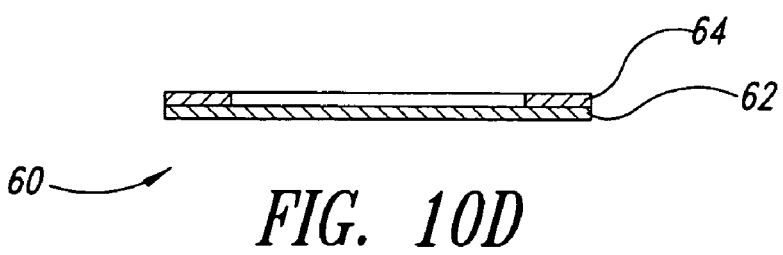
FIG. 10D is a cross-sectional view of the insert substrate of FIG. 10A taken along section line 10D.

FIG. 9 shows a method 130 of forming an RFID tag 10 according to another exemplary embodiment employing deposition of conductive material. Since the method 130 is identical for each embodiment of the antenna substrate 20*a*, 20*b*, 20*c*, 20*d*, the same collective references are employed as were employed for the method 100 of FIG. 8.

At 132, a first substrate 22 is provided. At 134, conductive material is deposited in a defined pattern on a face of the first substrate 22 to form a conductive layer 24 that will serve as an antenna. At 136, an electrically insulative substrate 28 is provided. At 138, conductive material is deposited on a face of the electrically insulative 28 substrate in a defined pattern to form the circuit 34.

At 140, semiconductor device 32 is electrically coupled to contact pads 42 of the circuit 34. Optionally, at 142, an encapsulant or glob-top 46 is deposited over the semiconductor device 32. At 144, the first and second substrates 22, 28 are physically coupled, the positions of the various circuit elements 36-44 relative to the antenna formed by the conductive layer 24 providing an electromagnetic coupling therebetween for transmitting signals between the semiconductor device 32 and the antenna (i.e., conductive layer 24).

At 146, a pressure sensitive self-adhesive layer 48 may be deposited on, and/or impregnated in, a portion of the RFID tag 10. At 148, the RFID tag 10 is attached to a release liner 12.

FIGS. 10A-10D show an insert substrate 60 for use in forming an RFID tag 10 according to another illustrated embodiment.

The insert substrate 60 comprises an insulative layer 62, a first conductive layer 64 carried by one face of the insulative layer 62 and a second conductive layer 66 carried by another face of the insulative layer 62. The first conductive layer 64 may be etched or deposited in a defined pattern to form a slot 26*a* to serve as an antenna. The slot 26*a* may take a variety of other shapes, such as those illustrated in FIGS. 5A-5E, 6A-6G and 7A-7C. The second conductive layer 66 may be etched or deposited in a defined pattern to form a circuit 34. A semiconductor device 32 may be electrically coupled to the circuit 34, such as in the manner previously described herein.

Figure 11:
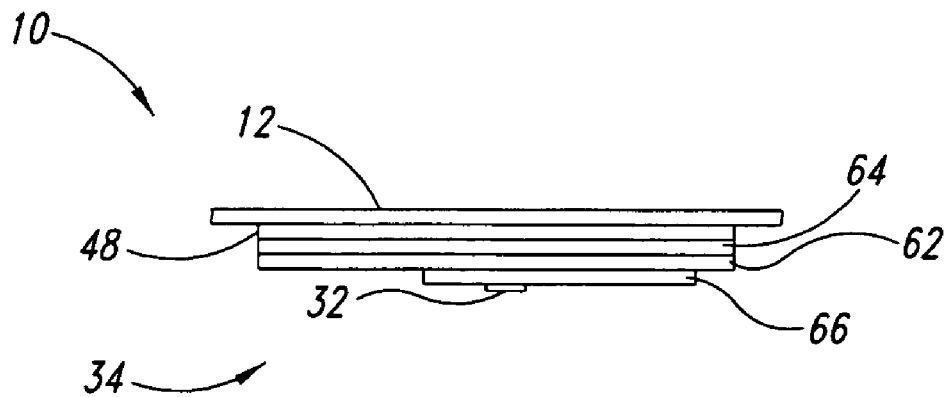
FIG. 11 is a side elevational view of an RFID tag formed using the insert substrate of FIGS. 10A-10D according to one illustrated embodiment.

FIG. 11 shows an RFID tag 10 formed from the insert substrate 60 of FIGS. 10A-10D according to one illustrated embodiment. As illustrated, a pressure sensitive self-adhesive layer 48 may be applied directly to the first conductive layer 64 (i.e., directly on antenna), and the resulting RFID tag 10 may be carried by a release liner 12. This provides an extremely low-cost RFID tag 10, that is simple to manufacture and comprises a minimal number of materials.

Figure 12:
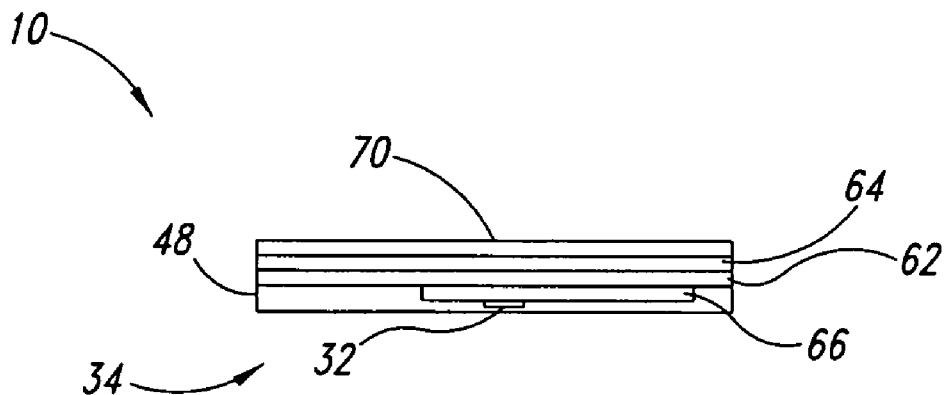
FIG. 12 is a cross-sectional view of an RFID tag formed from the insert substrate of FIGS. 10A-10D according to another illustrated embodiment.

FIG. 12 shows an RFID tag 10 formed from the insert substrate 60 of FIGS. 10A-10D according to another illustrated embodiment. As illustrated, the adhesive 48 may be applied over the circuit 34, the semiconductor device 32, and a portion the face of the insulative substrate 62 carrying the circuit 34. Optionally, a substrate 70 may cover all or a portion of the first conductive substrate 64 (i.e., antenna). The substrate 70 may provide one or more of environmental protection, electrical insulation, and/or a surface to receive printed or inscribed indicia.

Figure 13:
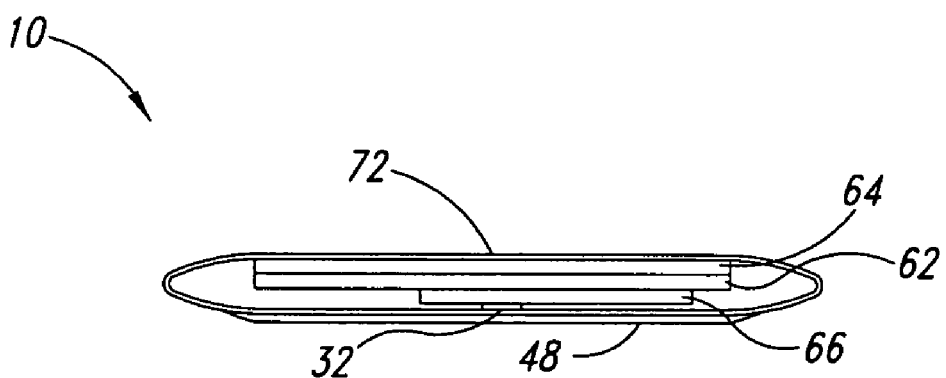
FIG. 13 is a cross-sectional view of an RFID tag formed from the insert substrate of FIGS. 10A-10D and a label package according to yet another illustrated embodiment.

FIG. 13 shows a further embodiment of an RFID tag 10 formed from the insert substrate 60 according to another illustrated embodiment. As illustrated, the insert substrate 60 is received in a space or envelope formed by one or more label substrates 72. Optionally, a pressure sensitive self-adhesive 48 may be applied to a portion of the label substrate 72. Human-readable indicia 16 and/or machine-readable indicia 18 may be printed on the label substrate 72.

Figure 14:
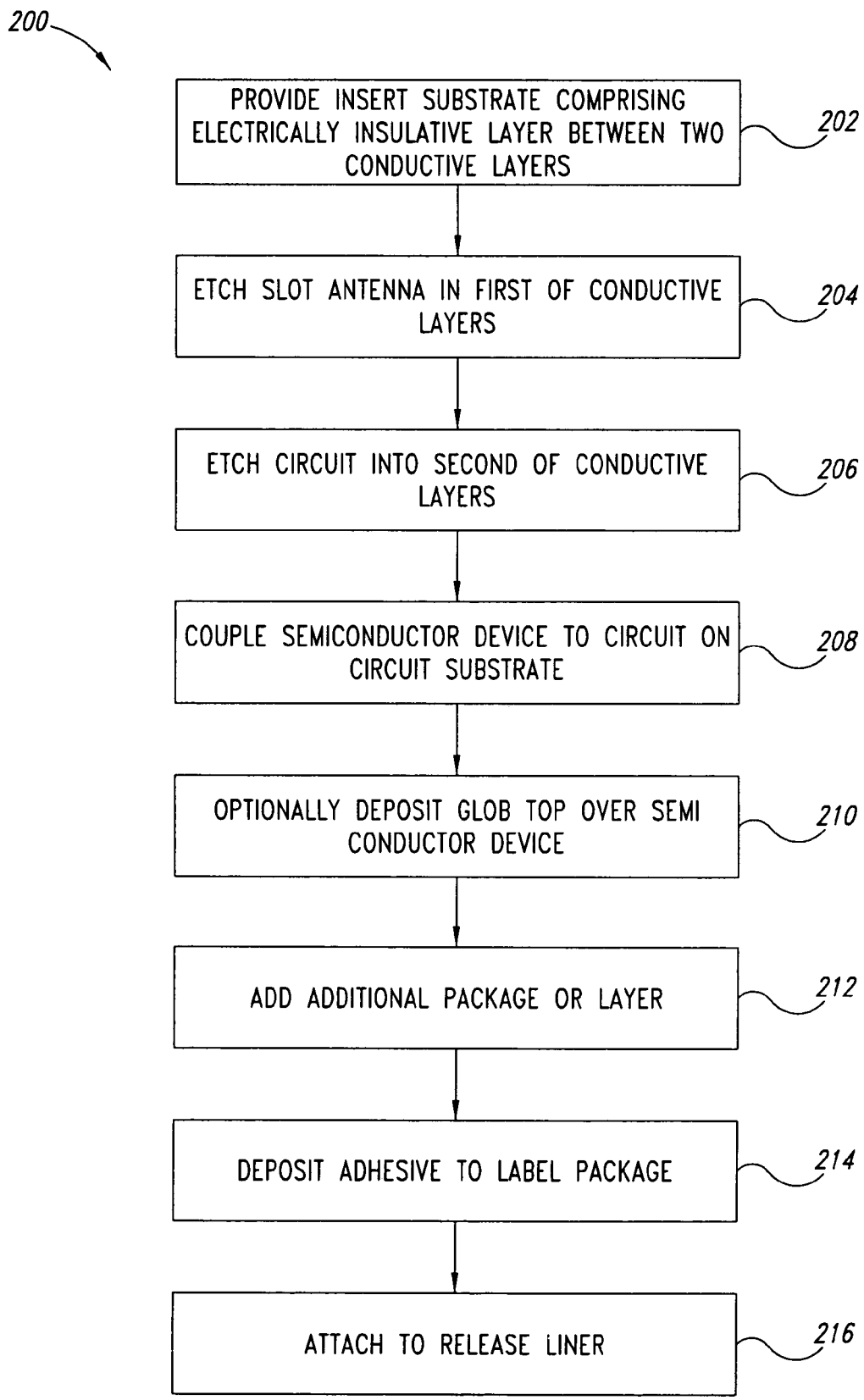
FIG. 14 is a flow diagram of a method of forming an RFID tag employing the insert substrate of FIGS. 10A-10D according to one illustrated embodiment.

FIG. 14 shows a method 200 for forming an RFID tag employing the insert substrate 60 of FIGS. 10A-10D, according to one illustrated embodiment.

At 202, the insert substrate 60 is provided, comprising an electrically insulative layer 62' between two conductive layers 64, 66. At 204, one of the conductive layers 64 is etched in a defined pattern to form a slot 26, the conductive layer 64 serving as an antenna. At 206, the other conductive layer 66 is etched in a defined pattern to form a circuit 34.

At 208, a semiconductor device 32 is electrically coupled to the circuit 34. Optionally at 210, an encapsulant or a glob-top 46 may be deposited over the semiconductor device 32.

At 212, additional packaging or layers may be added to the insert substrate 60. For example, the insert substrate 60 may be inserted into the protective envelope formed by the label substrate 72, such as illustrated in FIG. 13. Also for example, the insert substrate 60 may be coupled to a substrate 70, such as illustrated in FIG. 12.

At 214, a pressure sensitive self-adhesive 48 is applied to a portion of the insert substrate 60, label substrate 72 or substrate 70. At 216, the resulting RFID tag 10 is removably attached to the release liner 12.

Although specific embodiments of and examples for the reader and method of the invention are described herein for illustrative purposes, various equivalent modifications can be made without departing from the spirit and scope of the invention, as will be recognized by those skilled in the relevant art. The teachings provided herein of the invention can be applied to RFID transponders, not necessarily the RFID labels generally described above. For example, other slot shapes may be desirable. Some embodiments may employ antennas other than slot antennas. The circuits may employ additional elements or may eliminate some elements. The methods may add some acts, omit other acts, and perform acts in a different sequence than the illustrative embodiments.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all RFID tags and methods of manufacturing the same that operate in accordance with the claims. Accordingly, the invention is not limited by the disclosure, but instead its scope is to be determined entirely by the following claims.

The invention claimed is:

1. An RFID tag, comprising:
an antenna substrate comprising an insulative layer and a conductive layer, the insulative layer of the antenna substrate comprising a first surface and a second surface opposed to the first surface, the conductive layer of the antenna substrate carried by the second surface of the insulative layer of the antenna substrate, the conductive layer of the antenna substrate patterned to form a slot antenna;
a circuit substrate comprising an insulative layer and a conductive layer, the conductive layer of the circuit substrate patterned to form a circuit including an antenna line, a transformer, and a ground line, each conductively coupled to one another and physically formed in a plane defined by the conductive layer of the circuit substrate; and
a semiconductor device electrically coupled to the circuit, wherein the antenna substrate and circuit substrate are coupled such that at least one portion of the slot antenna is electro-magnetically coupled through the insulative layer of the circuit substrate to at least one portion of the circuit without an electrical current path therebetween, to provide signals between the slot antenna and the semiconductor device.

2. The RFID tag of claim 1 wherein the first surface of the insulative layer of the antenna substrate carries at least one of a human-readable or a machine-readable marking.

3. The RFID tag of claim 1 wherein the conductive layer of the antenna substrate is patterned via etching to form the slot antenna.

4. The RFID tag of claim 1 wherein the conductive layer of the antenna substrate is patterned via depositioning to form the slot antenna.

5. The RFID tag of claim 1 wherein the conductive layer of the circuit substrate is patterned via etching to form the circuit.

6. The RFID tag of claim 1 wherein the conductive layer of the circuit substrate is patterned via depositioning to form the circuit.

7. The RFID tag of clam 1, further comprising:
a pressure sensitive adhesive covering at least a portion of the semiconductor device and circuit; and
a selectively releasable release liner covering at least a portion of the pressure sensitive adhesive.

8. A method of forming an RFID tag, the method comprising:
providing an antenna substrate comprising a label stock and a conductive layer, the label stock of the antenna substrate comprising a first surface and a second surface opposed to the first surface, the conductive layer of the antenna substrate having a first area and carried by the second surface of the label stock of the antenna substrate;

providing a circuit substrate comprising an insulative layer and a conductive layer, the conductive layer of the circuit substrate having a second area, where the second area is substantially smaller than the first area;

etching the conductive layer of the antenna substrate to form a slot antenna;

etching the conductive layer of the circuit substrate to form a circuit having at least two of an antenna line, a transformer, an inductor, or a ground line, formed in a plane defined by the conductive layer of the circuit substrate;

electrically coupling a semiconductor device to the circuit; and physically coupling the antenna substrate and circuit substrate to provide signals between the slot antenna and the semiconductor device, wherein physically coupling the antenna substrate and circuit substrate to provide signals between the slot antenna and the semiconductor device, comprises positioning the antenna substrate and the circuit substrate such that at least a portion of the slot antenna is electro-magnetically coupled through the insulative layer of the circuit substrate to at least a portion of the circuit without any through-holes in the insulative layer.

9. The method of claim 8 wherein the conductive layer of the antenna substrate covers substantially all of the second surface of the label stock of the antenna substrate.

10. The method of claim 9 wherein the conductive layer of the circuit covers substantially less than all of the insulative layer of the circuit substrate.

11. An RFID tag, comprising:

an insert substrate comprising a first conductive layer, a second conductive layer and an insulative layer between the first and the second conductive layers, where the first conductive layer is patterned as a slot antenna and the second conductive layer is patterned as a circuit having at least two of an antenna line, a transformer, an inductor, or a ground line, formed in a plane defined by the second conductive layer, at least a portion of the slot antenna electro-magnetically coupled to at least a portion of the circuit without an electrical current path therebetween to transfer signals between the slot antenna and the circuit; and a semiconductor device electrically coupled to the circuit to transfer signals between the semiconductor device and the circuit.

12. The RFID tag of claim 11 wherein the insulative layer is solid, having no apertures extending therethrough.

13. The RFID tag of claim 11, further comprising:

a package substrate forming an envelope, wherein the insert substrate is received within the envelope.

14. The RFID tag of claim 11, further comprising:

an adhesive carried by at least a portion of the package substrate.

15. An RFID tag, comprising:

an electrically conductive circuit trace having at least two of an antenna line, a transformer, an inductor, or a ground line, formed in a plane defined by the circuit trace;

an electrically conductive slot antenna, the slot antenna spaced from the circuit trace and electrically insulated therefrom, at least a portion of the slot antenna electro-magnetically coupled to at least a portion of the circuit trace without an electrically conductive current path therebetween to transfer signals between the slot antenna and the circuit trace; and a semiconductor device electrically coupled to the circuit trace to transfer signals between the semiconductor device and the slot antenna via the circuit trace.

16. The RFID tag of claim 15 wherein the slot antenna is spaced from the circuit trace by at least one insulative layer.

17. The RFID tag of claim 15 wherein the slot antenna is spaced from the circuit trace by air.

* * * * *